May 22, 1962

J. INGELLIS 3,035,453

VARIABLE BELT-TENSIONING DEVICE
FOR SPEED-VARYING TRANSMISSION

Filed Oct. 17, 1960

INVENTOR.
JOHN INGELLIS
BY Harold B. Hood
ATTORNEY

May 22, 1962 J. INGELLIS 3,035,453
VARIABLE BELT-TENSIONING DEVICE
FOR SPEED-VARYING TRANSMISSION
Filed Oct. 17, 1960 2 Sheets-Sheet 2

INVENTOR.
JOHN INGELLIS
BY Harold B. Hood
ATTORNEY

United States Patent Office 3,035,453
Patented May 22, 1962

3,035,453
VARIABLE BELT-TENSIONING DEVICE FOR SPEED-VARYING TRANSMISSION
John Ingellis, Columbus, Ind., assignor to The Reliance Electric and Engineering Company, Euclid, Ohio, a corporation of Ohio
Filed Oct. 17, 1960, Ser. No. 62,977
9 Claims. (Cl. 74—230.17)

It has long been known that, in a variable speed transmission of the type in which a V-belt provides a driving connection between two expansible V-pulleys, belt tension increases as the transmission parts are adjusted in either direction from a 1:1 ratio. In the very early patent to Milton O. Reeves, No. 603,067, this phenomenon is expressed in the words "It is a well known principle that more belt is required to connect a large and a small pulley than is required to connect two pulleys of the same diameter, the mean between the large and small, both pairs being spaced the same distance between centers." During the first quarter of this century, a good deal of work was done upon the adjusting mechanisms of such transmissions, largely seeking to maintain uniformity of belt tension throughout the range of such transmissions, as represented by, among others, the patents to the said Milton O. Reeves Nos. 603,067, 630,407, 1,440,797 and culminating in Patent No. 1,546,996, the structure of which has been commercially followed, without very substantial modification, for nearly forty years.

In most of the above-mentioned patented structures, means is provided for adjusting belt tension; but the adjusting means there disclosed effects a change which is proportionally the same throughout the speed range of the transmission, without changing the characteristics of the belt tension curve. That is, any manipulation of such previously known devices which increases the belt tension by a given amount at the 1:1 ratio setting of the transmission will produce substantially the same amount of increase at the 2:1 setting or at the 1:2 setting of the transmission.

I have found that, in certain environments, it is actually advantageous to increase the belt tension significantly and automatically in certain phases of the speed range of the transmission; and it is the primary object of the present invention to provide means, in such a transmission, which will produce such an increase in belt tension at any preselected stage within such speed range, such change being independent of the tension characteristics of the conventional tension-control device concurrently used in the transmission.

A further object of the invention is to provide such means in a simple, inexpensive, trouble-free form which nevertheless is inherently adjustable so that the degree of its effect upon belt tension in the selected stage may be quickly and easily varied within a wide range including zero.

Still further objects of the present invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Figure 1:
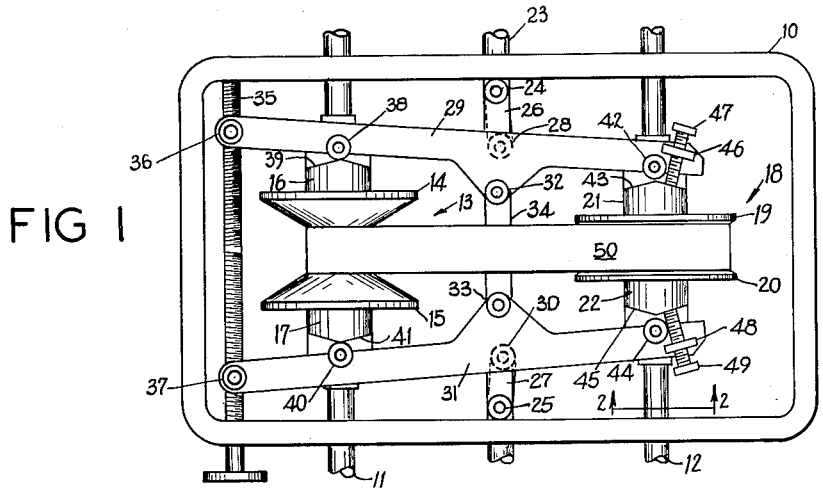
FIG. 1 is a plan view of a conventional variable speed transmission of the expansible V-pulley type, embodying the present invention.

Referring more particularly to the drawings, the reference numeral 10 illustrates the frame for a conventional variable speed transmission which includes an input shaft 11 and an output shaft 12 journalled for rotation about spaced, parallel axes. An expansible V-pulley, indicated generally by the reference numeral 13, is mounted on the shaft 11 and comprises mating coned discs 14 and 15 which are axially slidably keyed to the shaft 11. The disc 14 is backed by a thrust bearing 16 while the disc 15 is similarly backed by a similar bearing 17.

An expansible V-pulley indicated generally by the reference numeral 18 is mounted on the shaft 12 and comprises mating coned discs 19 and 20 which are axially shiftably keyed to the shaft. The disc 19 is backed by a thrust bearing 21 while the disc 20 is similarly backed by a similar thrust bearing 22.

A tension-adjusting screw shaft 23 is journalled in the frame 10 upon an axis parallel with, and midway between, the axes of the shafts 11 and 12; and pivot means 24 and 25 are carried on separate nuts (not shown) threadedly mounted on oppositely threaded portions of said shaft 23 respectively adjacent the opposite sides of the frame 10. Link means 26 has one end pivotally mounted on the pivot means 24 and link means 27 has one end pivotally mounted on the pivot means 25. The opposite end of the link means 26 is pivotally connected at 28 to lever means 29, intermediate the ends of said lever means; and the opposite end of the link means 27 is pivotally connected at 30 to lever means 31 intermediate the ends of said lever means. The lever means 29 is pivotally mounted on fulcrum means 32 while the lever means 31 is pivotally mounted on fulcrum means 33; and guide means 34 is operatively associated with the fulcrum means 32 and 33 to guide said fulcrum means for equal and opposite rectilinear movement in the direction of the axis of the shaft 23.

Near that end of the frame 10 adjacent the input shaft 11, a screw shaft 35 is journalled upon an axis parallel with the axes of the shafts 11 and 12; and fulcrum means 36 and 37, carried on nuts (not shown) threadedly mounted on oppositely threaded sections of the shaft 35, operatively engage the projecting ends of the lever means 29 and 31, respectively.

Roller means 38 carried by the lever means 29 is arranged for operative engagement with an abutment face 39 on the thrust bearing 16, and roller means 40 carried by the lever means 31 is arranged for operative engagement with the abutment surface 41 of the bearing 17. Roller means 42 carried by the lever means 29 is arranged for operative engagement with an abutment face 43 on the thrust bearing 21, and roller means 44 carried by the lever means 31 is arranged for operative engagement with an abutment face 45 on the thrust bearing 22.

Figure 2:
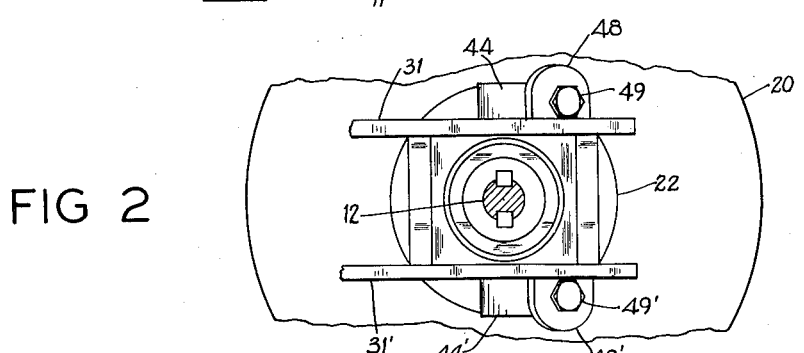
FIG. 2 is a fragmentary section, taken substantially on the line 2—2 of FIG. 1 and drawn to an enlarged scale.

As is most clearly illustrated in FIG. 2, each of the lever means comprises an upper member such as 31 and a lower member such as 31'; and the other parts associated with each lever means are similarly duplicated. An edge-active belt 50 provides a driving connection between the pulleys 13 and 18.

Thus far, the structure described is conventional. Obviously, as the screw shaft 35 is rotated to move the pivot points 36, 37 toward each other, the rollers 38 and 40 will enforce movement of the discs 14 and 15 toward each other, while separation of the rollers 42 and 44 will permit corresponding separation of the discs 19 and 20.

As the discs 14 and 15 approach each other, the belt 50 will be crowded radially outwardly therebetween to increase the effective diameter of the pulley 13, and said belt will be pulled radially inwardly between the discs 19 and 20 to decrease the effective diameter of the pulley 18, thereby increasing the speed of the shaft 12 relative to the speed of the shaft 11. During the travel of the lever means 29 and 31 enforced by such movement of the pivot points 36 and 37, said levers will rock about the fulcra 32 and 33 while the link means 26 and 27 will swing from their positions illustrated in FIG. 1 toward their positions illustrated in FIG. 3 thus somewhat reducing the degree of tension variation which results from the above-outlined principle.

Figure 3:
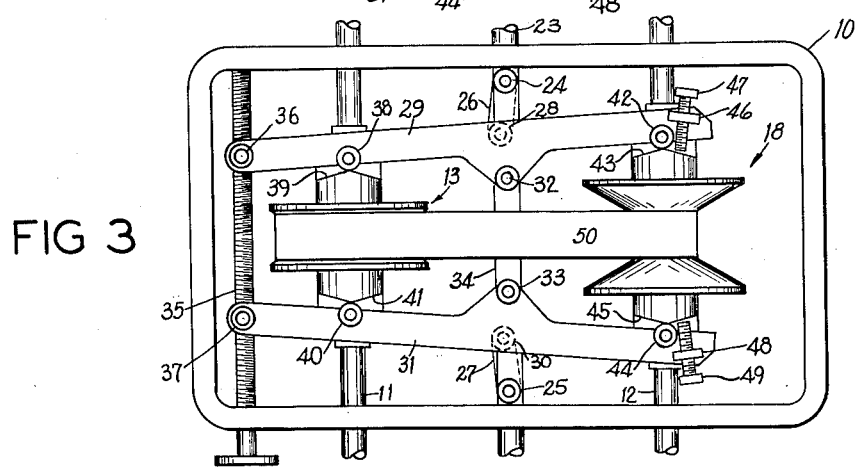
FIG. 3 is a plan view similar to FIG. 1 but showing the control parts in an opposite position of adjustment.

As has been stated, there are some environments in which it is desirable that belt tension should be radically increased somewhere within the range of speed adjustment of such a transmission, for instance near the lower end of the output speed range of the transmission. According to the present invention, I provide means carried by the lever means 29 and 31 which, as the transmission approaches the lower end of its output speed range, will shift the point of operative engagement of each lever means with the associated disc of the pulley 18 longitudinally of the lever means, thereby suddenly and radically increasing the degree of axial movement of each such disc resulting from a given degree of adjustment of the lever means. As illustrated in FIGS. 1 to 3, such means comprises a threadedly perforated ear 46 carried on that end of the lever means 29 beyond the roller 42, with an abutment screw 47 threadedly mounted in said ear, together with a similar ear 48 similarly supporting an abutment screw 49, similarly carried on the lever means 31. Preferably, but not necessarily, the ears 46 and 48 and their associated screws 47 and 49 are duplicated upon the lower elements of the respective lever means, as suggested at 48' and 49' in FIG. 2.

Figure 5:
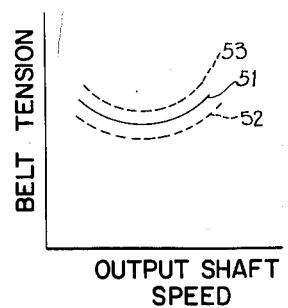
FIG. 5 is a graph showing typical speed-tension characteristics of a conventional variable speed transmission.
Figure 6:
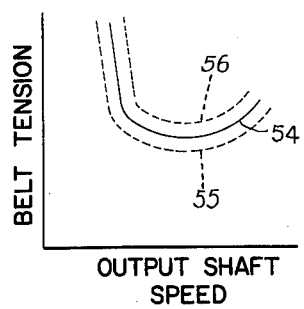
FIG. 6 is a similar graph showing speed-tension characteristics achieved through the present invention.

As shown in FIG. 1, the screws 47 and 49 are so adjusted in their ears 46 and 48 that, in the illustrated positions of the lever means 29 and 31, said screws have already engaged the abutment faces 43 and 45 of the thrust bearings 21 and 22 to move said thrust bearings out of contact with the rollers 42 and 44, respectively. Quite obviously, as the screw shaft 35 is further adjusted to move the pivot points 36 and 37 farther apart, the rollers 42 and 44 will be still further separated from said abutment faces of said thrust bearings. In the absence of abutment means such as the screws 47 and 49, and with a median setting of the adjustment shaft 23, the tension-output speed characteristics of the transmission will be presented by the curve 51 of FIG. 5. As the shaft 23 is manipulated to move the pivot points 24 and 25 toward each other, those characteristics will be represented by the broken line 53 of FIG. 5; and as said pivot points are moved away from each other, those characteristics will be represented by the broken line 52 of FIG. 5. With the screws 47 and 49 incorporated in the organization, however, and with the shaft 23 in a median position, the speed-tension characteristics of the assembly will follow the curve 54 of FIG. 6, breaking sharply upwardly as the screws 47 and 49 engage the surfaces 43 and 45, thus shifting the point of axial engagement between the lever means and the discs of the pulley 18, longitudinally of said lever means. Adjustment of the screw shaft 23 in one direction or the other will affect that ratio in the manner suggested by the broken curves 55 and 56 of FIG. 6.

Figure 4:
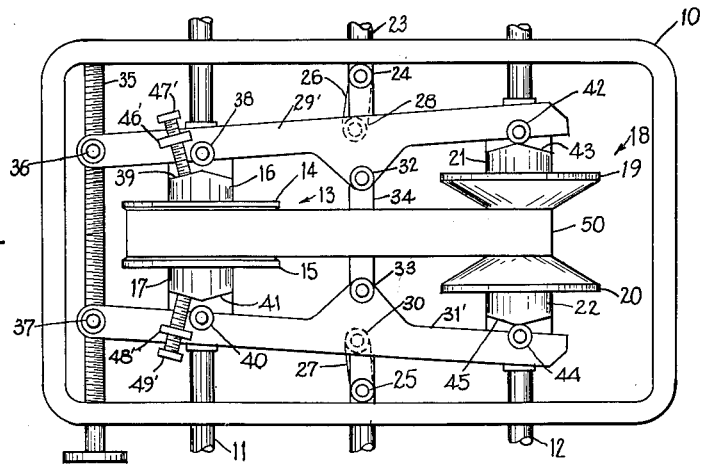
FIG. 4 is a plan view similar to FIG. 1 but showing a modified form of the invention.

If the transmission is to be used in an environment in which it is desirable sharply to increase the belt tension near the upper end of the output speed range, brackets 46' and 48', carrying abutment screws 47' and 49' may be mounted near the opposite ends of the lever means 29' and 31', for cooperation with the abutment faces 39 and 41 of the thrust bearings 16 and 17, as illustrated in FIG. 4.

It will be obvious that the adjustable abutment means illustrated in the drawings herein could be replaced, in situations in which adjustment thereof is not necessary, by fixed abutment means. It will also be clear that the principle disclosed herein may be utilized by variation in the character of the abutment means carried by the lever means or by variation in the shape of the abutment surfaces of the thrust bearings, to produce an increase in belt tension at any predetermined point within the speed range of the transmission.

Some of the advantages of the structure herein disclosed could be attained by providing abutment means, either adjustable or non-adjustable, on one only of the lever means 29 or 31; but it is preferable to provide such abutment means on both lever means in order to maintain belt alignment within the transmission.

I claim as my invention:

1. In a variable-speed transmission, a first shaft, a second shaft, said shafts being supported on substantially parallel axes, a first pair of coned discs mounted in facing relation on said first shaft for axial movement toward and away from each other, a second pair of coned discs mounted in facing relation on said second shaft for axial movement toward and away from each other, an edge-active belt providing a driving connection between said disc pairs, a pair of actuator levers mounted for oscillation in a plane parallel with the plane common to said shaft axes about separate pivotal axes disposed in a common plane perpendicular to said plane common to said shaft axes and substantially midway between said shaft axes, each lever having an operative bearing against the outer face of the corresponding discs of both pairs to resist movement of such discs away from their fellows, means for oscillably adjusting said levers equally and oppositely about their respective pivotal axes, and means carried by one of said levers for shifting longitudinally of said lever its point of bearing against one only of its engaged discs as said lever approaches one end of its path of oscillation.

2. In a variable-speed transmission, a first shaft, a second shaft, said shafts being supported on substantially parallel axes, a first pair of coned discs mounted in facing relation on said first shaft for axial movement toward and away from each other, a second pair of coned discs mounted in facing relation on said second shaft for axial movement toward and away from each other, an edge-active belt providing a driving connection between said disc pairs, a pair of actuator levers mounted for oscillation in a plane parallel with the plane common to said shaft axes about separate pivotal axes disposed in a common plane perpendicular to said plane common to said shaft axes and substantially midway between said shaft axes, each lever having an operative bearing against the outer face of the corresponding discs of both pairs to resist movement of such discs away from their fellows, means for oscillably adjusting said levers equally and oppositely about their respective pivotal axes, and abutment means carried by one of said levers, at a point more remote from its pivotal axis than its normal point of bearing against one only of said discs, to engage said one disc as said lever approaches one end of its path of oscillation.

3. In a variable-speed transmission, a first shaft, a second shaft, said shafts being supported on substantially parallel axes, a first pair of coned discs mounted in facing relation on said first shaft for axial movement toward and away from each other, a second pair of coned discs mounted in facing relation on said second shaft for axial movement toward and away from each other, an edge-active belt providing a driving connection between said disc pairs, a pair of actuator levers mounted for oscillation in a plane parallel with the plane common to said shaft axes about separate pivotal axes disposed in a common plane perpendicular to said plane common to said shaft axes and substantially midway between said shaft axes, each lever having an operative bearing against the outer face of the corresponding discs of both pairs to resist movement of such discs away from their fellows, means for oscillably adjusting said levers equally and oppositely about their respective pivotal axes, and abutment means carried by one of said levers, at a point more remote from its pivotal axis than its normal point of bearing against one only of said discs, to engage said one disc as said lever approaches one end of its path of oscillation, said abutment means being mounted on said lever for adjustable projection, transversely of the length of said lever, toward and away from said one disc.

4. In a variable-speed transmission, a first shaft, a second shaft, said shafts being supported on substantially parallel axes, a first pair of coned discs mounted in facing relation on said first shaft for axial movement toward and away from each other, a second pair of coned discs mounted in facing relation on said second shaft for axial movement toward and away from each other, an edge-active belt providing a driving connection between said disc pairs, a pair of actuator levers mounted for oscillation in a plane parallel with the plane common to said shaft axes about separate pivotal axes disposed in a common plane perpendicular to said plane common to said shaft axes and substantially midway between said shaft axes, each lever having an operative bearing against the outer face of the corresponding discs of both pairs to resist movement of such discs away from their fellows, means for oscillably adjusting said levers equally and oppositely about their respective pivotal axes, and means carried by each of said levers for shifting longitudinally of said lever its point of bearing against the disc of the same pair as said levers approach one end of their paths of oscillation.

5. In a variable-speed transmission, a first shaft, a second shaft, said shafts being supported on substantially parallel axes, a first pair of coned discs mounted in facing relation on said first shaft for axial movement toward and away from each other, a second pair of coned discs mounted in facing relation on said second shaft for axial movement toward and away from each other, an edge-active belt providing a driving connection between said disc pairs, a pair of actuator levers mounted for oscillation in a plane parallel with the plane common to said shaft axes about separate pivotal axes disposed in a common plane perpendicular to said plane common to said shaft axes and substantially midway between said shaft axes, each lever having an operative bearing against the outer face of the corresponding discs of both pairs to resist movement of such discs away from their fellows, means for oscillably adjusting said levers equally and oppositely about their respective pivotal axes, and abutment means carried by each of said levers, at a point more remote from its pivotal axis than its normal point of bearing against the disc of the same pair, to engage said last-mentioned disc as said levers approach one end of their paths of oscillation.

6. In a variable-speed transmission, a first shaft, a second shaft, said shafts being supported on substantially parallel axes, a first pair of coned discs mounted in facing relation on said first shaft for axial movement toward and away from each other, a second pair of coned discs mounted in facing relation on said second shaft for axial movement toward an away from each other, an edge-active belt providing a driving connection between said disc pairs, a pair of actuator levers mounted for oscillation in a plane parallel with the plane common to said shaft axes about separate pivotal axes disposed in a common plane perpendicular to said plane common to said shaft axes and substantially midway between said shaft axes, each lever having an operative bearing against the outer face of the corresponding discs of both pairs to resist movement of such discs away from their fellows, means for oscillably adjusting said levers equally and oppositely about their respective pivotal axes, and abutment means carried by each of said levers, at a point more remote from its pivotal axis than its normal point of bearing against the disc of the same pair, to engage said last-mentioned disc as said levers approach one end of their paths of oscillation, each such abutment means being mounted on its lever for adjustable projection, transversely of its lever, toward and away from its associated disc.

7. In a variable-speed transmission, a first shaft, a second shaft, said shafts being supported on substantially parallel axes, a first pair of discs having coned inner faces mounted on said first shaft for axial movement toward and away from each other, a second pair of discs having coned inner faces mounted on said second shaft for movement toward and away from each other, a thrust bearing engaging the outer face of each disc, each bearing having an abutment surface facing away from its associated disc, an edge-active belt confined between the coned surfaces of said discs and providing a driving connection between said disc pairs, a pair of actuator levers mounted for oscillation in a plane parallel with the plane common to said shaft axes about separate pivotal axes disposed in a common plane perpendicular to said plane common to said shaft axes and substantially midway between said shaft axes, abutment means carried by one lever and normally engaging the abutment surface of the thrust bearing associted with one disc of each pair and abutment means carried by the other lever and normally engaging the abutment surface of the thrust bearing associated with the other disc of each pair to resist movement of each disc away from its fellow, means for oscillably adjusting said levers equally and oppositely about their pivotal axes, and auxiliary abutment means carried by each lever, at a point more remote from its pivotal axis than one of said first-named abutment means, to engage said abutment surfaces of the thrust bearings associated with the discs of one pair as said levers approach one end of their paths of oscillation.

8. In a variable-speed transmission, a first shaft, a second shaft, said shafts being supported on substantially parallel axes, a first pair of discs having coned inner faces mounted on said fisrt shaft for axial movement toward and away from each other, a second pair of discs having coned inner faces mounted on said second shaft for movement toward and away from each other, a thrust bearing engaging the outer face of each disc, each bearing having an abutment surface facing away from its associated disc, an edge-active belt confined between the coned surfaces of said discs and providing a driving connection between said disc pairs, a pair of actuator levers mounted for oscillation in a plane parallel with the plane common to said shaft axes about separate pivotal axes disposed in a common plane perpendicular to said plane common to said shaft axes and substantially midway between said shaft axes, abutment means carried by one lever and normally engaging the abutment surface of the thrust bearing associated with one disc of each pair and abutment means carried by the other lever and normally engaging the abutment surface of the thrust bearing associated with the other disc of each pair to resist movement of each disc away from its fellow, means for oscillably adjusting said levers equally and oppositely about their pivotal axes, and auxiliary abutment means carried by each lever, at a point more remote from its pivotal axis than one of said first-named abutment means, to engage said abutment surfaces of the thrust bearings associated with the discs of one pair as said levers approach one end of their paths of oscillation, each of said auxiliary abutment means being mounted on its lever for adjustable projection, transversely of its lever, toward and away from its associated disc.

9. In a variable-speed transmission, a first shaft, a second shaft, said shafts being supported on substantially parallel axes, a first pair of discs having coned inner faces mounted on said first shaft for axial movement toward and away from each other, a second pair of discs having coned inner faces mounted on said second shaft for movement toward and away from each other, a thrust bearing engaging the outer face of each disc, each bearing having an abutment surface facing away from its associated disc, an edge-active belt confined between the coned surfaces of said discs and providing a driving connection between said disc pairs, a pair of actuator levers mounted for oscillation in a plane parallel with the plane common to said shaft axes about separate pivotal axes disposed in a common plane perpendicular to said plane common to said shaft axes and substantially midway between said shaft axes, two rollers carried by one lever and normally engaging, respectively, the abutment surfaces of the thrust bearings respectively associated with one disc of each pair and two rollers carried by the other lever and normally engaging, respectively, the abutment surfaces of the thrust bearings respectively associated with the other disc of each pair to resist movement of each disc away from its fellow, means for oscillably adjusting said levers equally and oppositely about their pivotal axes, and threaded abutment means carried by each lever at a point more remote from its pivotal axis than one of said rollers, said threaded abutment means being threadedly adjustable transversely relative to their respective levers, to engage said abutment surfaces of the thrust bearings associated with the discs of one pair as said levers approach one end of their paths of oscillation.

References Cited in the file of this patent

UNITED STATES PATENTS

| | | |
|---|---|---|
| 818,450 | Hunter | Apr. 24, 1906 |
| 1,235,794 | Hardaker | Aug. 7, 1917 |
| 1,546,996 | Reeves | July 21, 1925 |
| 2,593,163 | Matheson | Apr. 15, 1952 |